United States Patent [19]
Honkomp et al.

[11] Patent Number: 4,811,831
[45] Date of Patent: Mar. 14, 1989

[54] METHOD AND APPARATUS FOR POSITIONING ARTICLES

[75] Inventors: Glenn A. Honkomp, Warren; Larry G. Burrows, Hamilton, both of Ohio

[73] Assignee: Emerson Electric Co., St. Louis, Mo.

[21] Appl. No.: 743,988

[22] Filed: Jun. 12, 1985

[51] Int. Cl.⁴ .............................................. B65G 47/24
[52] U.S. Cl. .................... 198/394; 198/765; 198/766
[58] Field of Search ............... 198/382, 394, 396, 750, 198/766, 601, 609, 360, 442, 752, 762, 763, 631, 765; 221/156–160, 163; 248/638; 74/26, 49, 86; 16/24–27; 414/757, 784

[56] References Cited

U.S. PATENT DOCUMENTS

| | | | |
|---|---|---|---|
| 1,011,444 | 12/1911 | Kihlgren | 198/631 |
| 1,720,299 | 7/1929 | Stebbins | 74/26 |
| 2,232,124 | 2/1941 | Markley | 198/766 |
| 2,863,552 | 12/1958 | Bailey | 221/156 |
| 3,756,407 | 9/1973 | Christensen | 74/86 |
| 4,402,108 | 9/1983 | Pannwitz | 16/26 |

*Primary Examiner*—Joseph E. Valenz
*Attorney, Agent, or Firm*—Polster, Polster and Lucchesi

[57] ABSTRACT

A method and apparatus for positioning an article having opposed ends at least one of which is flat and an irregular surfaced body portion between the ends so that the article can stably rest on the flat end including feeding one or more of such articles to a substantially horizontal support surface in random orientation and imparting a simultaneous back-and-forth and side-to-side motion on the surface with the resulting forces on each article created by such motion causing each article to seek a stable position bringing each article to rest on the flat end of the article.

11 Claims, 2 Drawing Sheets

METHOD AND APPARATUS FOR POSITIONING ARTICLES

BACKGROUND OF THE INVENTION

The present invention relates to a method and apparatus for positioning articles on a support surface and, more particularly, to a method and apparatus for positioning one or more articles on a support surface, each of which articles has at least one flat end so that the article can stably rest on such flat end.

It is generally well known in the article handling arts to position an article of non-uniform dimension by moving the article in a longitudinal path and to make physical contact with the moving article, usually at a location removed from its surface resting side, to position the article in a preselected position. For example, U.S. Pat. No. 2,198,594, issued to W. J. Mundy on Apr. 30, 1940, teaches a chain conveyor moved in a longitudinal direction with guide members positioned above the conveyor to contact and position the articles. U.S. Pat. No. 2,990,935, issued to E. E. Bailey on July 4, 1961, teaches a reciprocating inclined table and guide rails coming into contact with articles on the table to orient such articles upon their ends of smaller diameter. Further, U.S. Pat. No. 3,993,187 issued to J. Knez on May 14, 1975, teaches a longitudinally moving conveyor belt with guide means in successive zones adapted to contact cups on the conveyor belt which cups each have an open end of greater diameter to repose each of the cups on its open end for subsequent stacking, a rejecting apparatus positioned above the conveyor serving to remove cups not so reposed.

The present invention recognizes that past article positioning or orienting devices, such as those described, as well as others known in the art, have been complex in manufacture, operation and maintenance and have been both expensive in cost and in energy and labor consumption. Further, such past devices, because of the physical contact on the article, have often resulted in article bruising or breaking, particularly with those articles which are delicate and readily frangible. Recognizing these past deficiencies, the present invention provides a new and novel method and apparatus for positioning articles in the course of processing which is economical and straightforward in operation and maintenance, requiring a minimum of operating parts and consuming a minimum of energy. Moreover, the unique method and apparatus of the present invention minimizes the often damaging physical contact with the article to be positioned and thus reduces burdensome and costly rejects. Various other features of the present invention will become obvious to one skilled in the art upon reading the disclosure set forth herein.

SUMMARY OF THE INVENTION

More particularly, the present invention provides a method of positioning an article having opposed ends at least one of which is flat and an irregular surfaced body portion between the ends so that the article can stably rest on the flat end comprising: feeding the article in random orientation to a support surface disposed in a substantially horizontal plane; moving the support surface with the article disposed thereon alternatively in a back-and-forth direction; and, simultaneously moving the support surface with the article disposed thereon alternatively in a side-to-side direction so that the resulting forces created by such simultaneous motion of the support surface cause the article to seek a stable position and rest on the flat end of the article. In addition, the present invention provides an apparatus for positioning an article having opposed ends at least one of which is flat and an irregular surfaced body portion between the ends so that the article can stably rest on the flat end comprising: an article receiving tray, the upper surface of which is disposed in a horizontal plane to receive and provide a support surface for the article; a support platform for the tray; bearing means interposed between the tray and platform to permit the tray to move relative the platform; and means to simultaneously move the tray relative the platform in a back-and-forth and side-to-side direction on the bearing means so that the resulting forces created by such simultaneous motion of the tray cause an article fed to the support surface of the tray to seek a stable position to rest on the flat end thereof.

It is to be understood that various changes can be made in the several steps of the inventive method and in the several parts of the inventive apparatus disclosed herein without departing from the scope or spirit of the present invention.

BRIEF DESCRIPTION OF THE DRAWINGS

Referring to the drawings which disclose one advantageous embodiment of the inventive method and apparatus for positioning an article and a modification thereof.

DETAILED DESCRIPTION OF THE INVENTION

Figure 1:
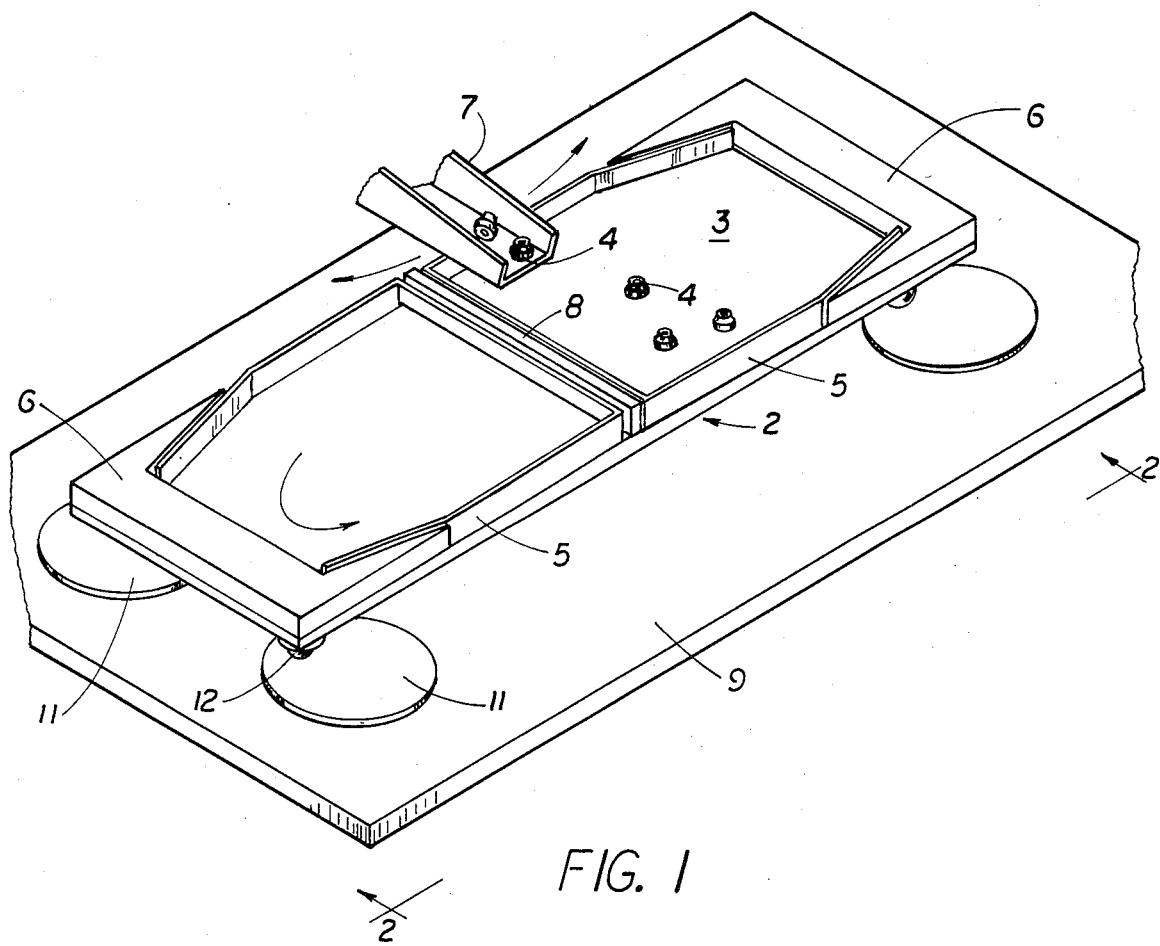
FIG. 1 is an overall isometric view of an inventive apparatus which can be used in carrying out several steps of the inventive method, corner portions of the platform being cut off because of illustration limitations.

Referring to FIG. 1 of the drawings, the inventive apparatus for stably positioning articles having at least one flat end is disclosed as including an article receiving support table 2, the upper surface of which is disposed in a substantially horizontal plane to receive and provide a support surface for carrying trays 5, the articles 4, in turn, being placed in random fashion on support surface 3 of open-ended carrying tray 5. In the embodiments shown, articles 4 are disclosed as being in the form of hollow ceramic sleeves of the type used in conjunction with hermetic terminal assemblies. As is known, each sleeve 4 includes opposed flat ends having intermediate therebetween a hollow cylindrical or irregularly shaped body portion and a hollow truncated cone portion with the body portion having a diameter greater than the overall height of the sleeve.

It is to be noted that the upper surface of table 2 is provided with opposed horseshoe shaped retaining guards 6 at the extremities of support table 2 to retain articles 4 on surface 3 of open-ended carrying trays 5, the articles 4 being fed unto surface 3 of carrying trays 5 in random gravity fashion from the end of pivotally inclined chute 7 positioned in spaced relation above the carrying trays 5 removably mounted on the upper surface of support table 2.

An intermediate guard rail 8 between guards 6 serves to divide the upper surface of support table 2 into two sections to receive opposed carrying trays 5 which can be readily removed and reversed to further permit easy article loading from pivotable chute 7. To hold support table 2 and thus, carrying trays 5, a support platform 9 is provided below support table 2. Platform 9 includes a set (four) of circular wear pads 11 (FIGS. 2 and 4) mounted at the corners thereof to each receive one of the bearings of the set (four) of ball bearing casters 12 which are mounted to the lower or under surface of table 2. It is to be understood that various platforms and even a floor could be used to support the table 2. It also is to be understood that the upper surface of support table 2 can slope slightly in a preselected manner to permit collection of articles on carrying trays 5 at a desired location.

Figure 2:
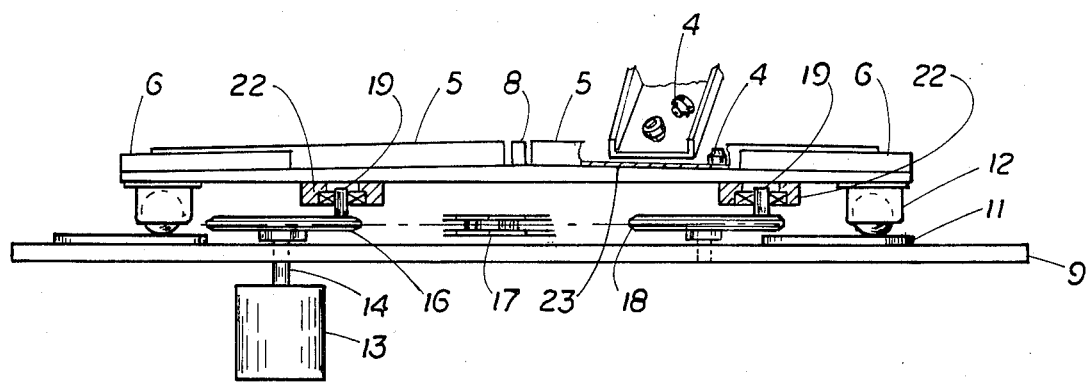
FIG. 2 is a slightly reduced side view of the apparatus of FIG. 1 taken in a plane through line 2—2 of FIG. 1.
Figure 3:
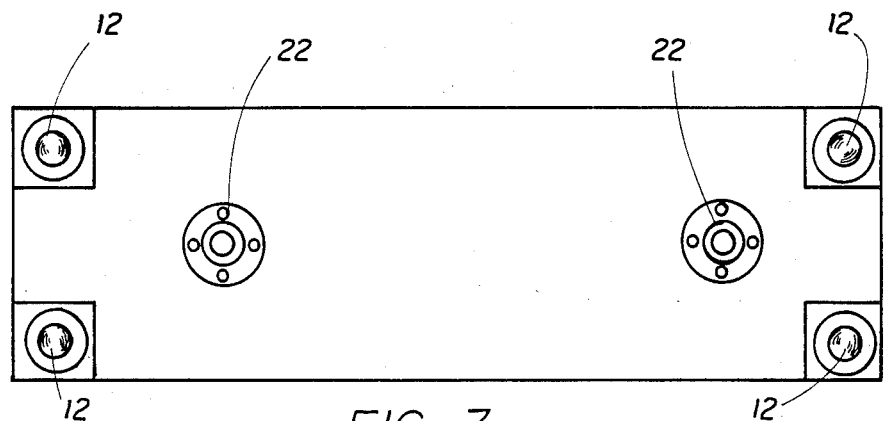
FIG. 3 is a plan view of the under surface of the table of FIG. 1
Figure 4:
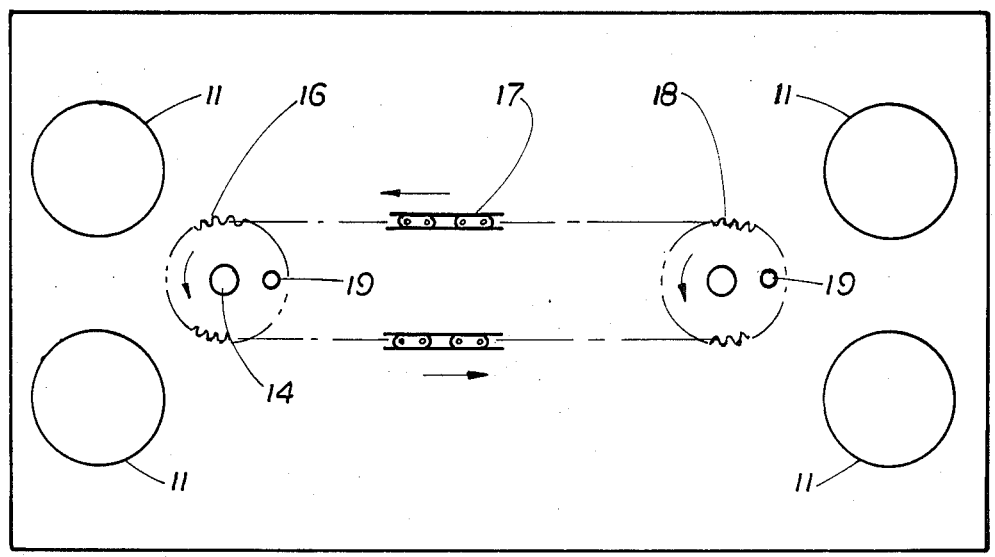
FIG. 4 is a plan view of the upper surface of the platform of FIG. 1 on which the table is mounted for motion actuation.
Figure 5:
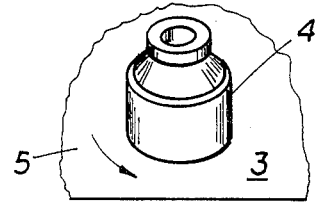
FIG. 5 is an enlarged view of a portion of a tray of FIG. 1, disclosing forces acting on a hollow ceramic sleeve for hermetic terminal assemblies, the sleeve as disclosed including opposed flat surface ends having a hollow cylindrical or irregularly surfaced body portion and hollow truncated cone portion intermediate the opposed flat ends with the body portion having a diameter greater than the overall height of the sleeve, being shown as it is positioned to rest on its wide body portion end; and, FIG. 6 is an enlarged view similar to FIG. 5 disclosing a modified embodiment of the present invention showing a sleeve about to rest within a confined open space in a tray, the space conforming with the peripheral shape of the wider body portion of the sleeve.

To impart the desired motion to table 2 in accordance with the novel feature of the present invention, a suitable power source which can be in the form of a variable speed electric motor 13 is mounted relative the platform (below, as shown) with the drive shaft 14 thereof rotatably extending through a suitable aperture in platform 9. The shaft 14 of motor 13 engages with a driving gear 16 which in turn connects through drive chain 17 with driven gear 18, both gears being rotatably spaced on platform 9 (FIGS. 2 and 4).

Each gear 16 and 18 is provided with a cam pin which extends in a vertical fashion from the periphery of the gear on which it is mounted. To receive the spaced cam pins 19 a pair of spaced pin receiving members 22 are mounted on the undersurface 23 of table 2. The pin receiving members 22, when engaged by pins 19, allow movement of support table 2 in a substantially circular path to provide simultaneous back-and-forth and side-to-side movement of support table 2 and carrying trays 5 mounted thereon. It is to be noted that pin receiving members 22 are each in the form of a bearing cage.

Figure 6:
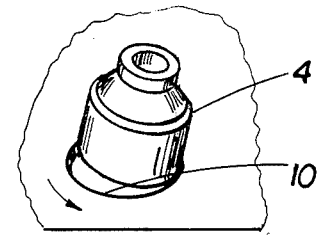

In carrying out the steps of the inventive method, a plurality of articles 4 having opposed ends at least one of which is flat and an irregular surfaced body portion between the ends so that the articles can stably rest on the flat ends—such as the disclosed hollow ceramic sleeves for hermetic terminal assemblies with each sleeve's body portion having a diameter greater than the overall height of the body and truncated cone portion—can be fed in random fashion from pivotal chute 7 positioned above carrying trays 5. Trays 5 are supported on table 2 with surface 3 being disposed in a substantially horizontal plane. With the sleeves or articles 4 disposed on trays 5 initially in random fashion, the support table 2 is moved simultaneously in a back-and-forth and side-to-side direction. Such simultaneous motion of the support table 2 creates resulting forces which cause the sleeves to seek a more stable position to rest on the surface 3 of carrying trays 5 with the larger ends in faced relation to the support surfaces of the trays for further processing of the sleeves. As can be seen in FIG. 6, each of the sleeves can be caused to rest through the resulting forces in a confined space or recess 10 in tray 5, the recess 10 conforming with the peripheral shape of the body portion ends. Although in the disclosed embodiment, the simultaneous motion to create the resulting forces is accomplished by moving the support surfaces in a substantially circular path, it is to be understood that, depending upon such parameters as the shape of the article to be positioned, that other paths—such as eliptical—might also be traced to create the desired simultaneous motion. It also is to be understood that other type drives besides the chain and gear system disclosed can be utilized without departing from the scope or spirit of the present invention. For example, it would be possible to accomplish the desired motion with an inter-fitting rack and pinion system or through a system of interconnected gears.

The invention claimed is:

1. A method of positioning an article having opposed ends at least one of which is flat and an irregular surfaced body portion between the ends so that the article can stably rest on the flat end comprising: feeding the article in random orientation to a support surface disposed in a substantially horizontal plane; moving said support surface with the article disposed thereon alternatively in a back-and-forth direction; and, simultaneously moving said support surface with the article disposed thereon in the same plane of movement alternatively in a side-to-side direction so that the resulting forces created by such simultaneous motion of said support surface cause the article to seek a stable position to rest in oriented position on the flat end of the article.

2. The method of claim 1, wherein said support surface is moved in a substantially circular path.

3. The method of claim 1, wherein said article is caused to rest within a confined space conforming with the peripheral shape of the resting portion of said article.

4. The method of claim 1, wherein a plurality of articles are gravity fed in random fashion from a preselected position above said support surface.

5. A method of positioning for further processing hollow ceramic sleeves for hermetic terminal assemblies, each sleeve including opposed flat surface ends having a hollow cylindrical body portion and a hollow truncated cone portion intermediate the opposed flat ends with the body portion having a diameter greater than the overall height of said sleeve comprising: gravity feeding a plurality of said ceramic sleeves in random orientation from a preselected position above a support surface disposed in a substantially horizontal plane unto said support surface; moving said support surface with the sleeves disposed thereon initially in random orientation in a substantially circular path to move the sleeves simultaneously in a back-and-forth and side-to-side direction so that the resulting forces created by such simultaneous movement of said support surface cause the sleeves to seek a stable position to rest in oriented position on the body portion ends for further processing.

6. Apparatus for positioning and orienting an article having opposed ends at least one of which is flat and an irregular surfaced body portion between the ends so that the article can stably rest in oriented position on the flat end comprising: a feed means to feed an article in random orientation; an article receiving orienting support tray, the upper surface of which is disposed in a substantially horizontal plane to receive said random oriented article from said feed means, said tray providing a support surface for said article; a support platform for said tray; bearing means interposed between said support tray and platform to permit said tray to move relative said platform; and means to simultaneously move said tray relative said platform in one plane in back-and-forth and side-to-side direction on said bearing means so that the resulting forces created by each simultaneous motion of said tray cause an article fed to said support surface of said tray to seek a stable oriented position to rest on the flat end thereof.

7. The apparatus of claim 6, said bearing means comprising a set of ball bearing casters interposed between the lower surface of said tray and said platform.

8. The apparatus of claim 6, said feed means including a moveable chute positioned above the upper surface of said tray to gravity feed said article in random orientation to said tray.

9. The apparatus of claim 6, said means to move said tray including a tray support table, a drive motor and an eccentric drive gear system connecting said motor to the lower surface of said tray support table.

10. The apparatus of claim 9, said eccentric drive gear sytem including spaced driving and driven gears rotatably mounted on said platform and connected by an endless chain, each of said gears having a cam pin mounted on the periphery thereof, and a pair of spaced pin receiving members mounted on the under surface of said tray to receive said cam pins, to move said table in a substantially circular path to provide said simultaneous back-and-forth and side-to-side movement of said tray on said support table.

11. Apparatus for positioning hollow ceramic sleeves for hermetic terminal assemblies, each sleeve having opposed flat ends and including a hollow cylindrical body portion and a hollow truncated cone portion therebetween with the body portion having a diameter greater than the overall height of said sleeve comprising: a pair of sleeve receiving moveable carrying trays; a support table, the upper surface of which is disposed in a substantially horizontal plane slightly sloping in a preselected manner and to receive and provide support surfaces for said pair of moveable carrying trays for said sleeves, said upper surface of said support table having sleeve retaining guards at the extremities thereof and an intermediate rail between said retaining guards to divide said upper surface into two support sections, one for each carrying tray; a moveable chute positioned above said carrying trays to selectively gravity feed sleeves to said trays in random fashion position; a set of ball bearing casters mounted to the lower surface of said support table at the corners thereof; a support platform for said support table, said support platform having a set of wear pads mounted thereon to receive the bearings of said casters; a drive motor mounted relative the platform to provide the driving power for movement of said support table with the carrier trays thereon; spaced driving and driven gears rotatably mounted on said platform and connected by an endless chain, said driving gear being connected to said drive motor; a cam pin mounted on the periphery of each of said gears; and a pair of spaced bearing cage pin receiving members mounted on the under surface of said support table to receive said cam pins to move said support table and said carrier trays thereon in a substantially circular path to provide said simultaneous back-and-forth and side-to-side movement of said carrier trays to cause sleeves on said carrier trays to seek a stable position to rest on body portion ends near the open-ended sides of the trays for further processing.

* * * * *

UNITED STATES PATENT AND TRADEMARK OFFICE
CERTIFICATE OF CORRECTION

PATENT NO. : 4,811,831
DATED : March 14, 1989
INVENTOR(S) : Glenn A. Honkomp and Larry G. Burrows It is certified that error appears in the above-identified patent and that said Letters Patent is hereby corrected as shown below:

Column 5, line 17, "each" should be ---such---.

Signed and Sealed this

Twentieth Day of March, 1990

Attest:

JEFFREY M. SAMUELS

Attesting Officer

Acting Commissioner of Patents and Trademarks